(12) United States Patent
Wang

(10) Patent No.: US 9,535,313 B2
(45) Date of Patent: Jan. 3, 2017

(54) UNDERWATER PROJECTION

(71) Applicant: Scienstry, Inc., Richardson, TX (US)

(72) Inventor: Jiansheng Wang, Plano, TX (US)

( * ) Notice: Subject to any disclaimer, the term of this patent is extended or adjusted under 35 U.S.C. 154(b) by 17 days.

(21) Appl. No.: 13/748,358

(22) Filed: Jan. 23, 2013

(65) Prior Publication Data

US 2014/0078409 A1    Mar. 20, 2014

Related U.S. Application Data

(60) Provisional application No. 61/701,272, filed on Sep. 14, 2012, provisional application No. 61/701,288, filed on Sep. 14, 2012.

(51) Int. Cl.

| | | |
|---|---|---|
| *G03B 21/60* | (2014.01) | |
| *G03B 21/14* | (2006.01) | |
| *G03B 21/608* | (2014.01) | |
| *G02F 1/13* | (2006.01) | |
| *G02F 1/1333* | (2006.01) | |
| *G02F 1/1334* | (2006.01) | |
| *G03B 21/16* | (2006.01) | |
| *G03B 21/54* | (2006.01) | |

(52) U.S. Cl.
CPC .......... *G03B 21/145* (2013.01); *G02F 1/1313* (2013.01); *G02F 1/1334* (2013.01); *G02F 1/13338* (2013.01); *G03B 21/16* (2013.01); *G03B 21/54* (2013.01); *G03B 21/60* (2013.01); *G03B 21/608* (2013.01); *Y10T 29/49117* (2015.01); *Y10T 29/49826* (2015.01)

(58) Field of Classification Search
USPC ........................ 353/28, 121, 122, 79; 348/81
See application file for complete search history.

(56) References Cited

U.S. PATENT DOCUMENTS

| | | | | |
|---|---|---|---|---|
| 4,974,779 | A | * | 12/1990 | Araki et al. ..................... 239/18 |
| 5,729,242 | A |  | 3/1998 | Margerum et al. |
| 6,144,556 | A | * | 11/2000 | Lanclos ......................... 361/695 |
| 6,261,650 | B1 |  | 7/2001 | Kobayashi et al. |
| 6,577,355 | B1 |  | 6/2003 | Yaniv |
| 6,588,909 | B2 | * | 7/2003 | Yaniv et al. .................... 353/98 |
| 7,969,405 | B2 |  | 6/2011 | Kwan |
| 8,016,434 | B2 |  | 9/2011 | Turner et al. |
| 8,328,367 | B2 |  | 12/2012 | Nemeth et al. |
| 9,028,074 | B2 | * | 5/2015 | Yamauchi .............. G09G 3/002 349/7 |
| 2006/0061860 | A1 | * | 3/2006 | Devos ..................... G03B 21/56 359/443 |
| 2007/0024822 | A1 |  | 2/2007 | Cortenraad et al. |
| 2010/0144432 | A1 |  | 6/2010 | Nittou |
| 2010/0184510 | A1 |  | 7/2010 | Nittou |
| 2011/0018913 | A1 |  | 1/2011 | Nittou |
| 2012/0140147 | A1 |  | 6/2012 | Satoh et al. |
| 2012/0182334 | A1 |  | 7/2012 | Ranieri et al. |

(Continued)

FOREIGN PATENT DOCUMENTS

| | | | |
|---|---|---|---|
| JP | 2008-216412 | * | 9/2008 |
| KR | 1020080056932 |  | 6/2008 |

*Primary Examiner* — William C Dowling
(74) *Attorney, Agent, or Firm* — Wilson D Swayze, Jr.

(57) ABSTRACT

A projection apparatus for projection in a liquid environment comprises a projection surface adapted to be positioned in the liquid environment and a projector adapted to be positioned in the liquid environment. The projector is adapted to project an image on the projection surface.

18 Claims, 2 Drawing Sheets

(56) References Cited

U.S. PATENT DOCUMENTS

| | | | |
|---|---|---|---|
| 2013/0215012 A1* | 8/2013 | Reddy et al. | 345/156 |
| 2013/0215394 A1* | 8/2013 | Reddy et al. | 353/31 |
| 2014/0078410 A1* | 3/2014 | Wang | G02B 23/22 349/5 |
| 2014/0085613 A1* | 3/2014 | Doyle et al. | 353/69 |
| 2014/0300830 A1* | 10/2014 | Wang | G02F 1/1339 349/5 |

\* cited by examiner

UNDERWATER PROJECTION

CROSS REFERENCE TO RELATED APPLICATIONS

This application claims the benefit of U.S. Provisional Applications 61/701,272 and 61/701,288 both filed Sep. 14, 2012, which are incorporated by reference herein in their entirety.

FIELD

The present disclosure is directed toward projection systems and methods of use, and more particularly to systems and methods for projection in a liquid environment.

BACKGROUND

An increase in human underwater activities has led to the development of tools to assist humans in underwater environments. Underwater transportation systems (e.g. submarines), underwater exercise equipment (e.g., underwater treadmills), and underwater image capture equipment (e.g., waterproof cameras) are examples of tools to assist humans in underwater environments. Modern image projection systems are designed for operation in dry environments and are currently unsuitable for use in liquid environments. There exists a need for projection systems that provide quality image projection and robust display capability in a liquid environment.

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

DETAILED DESCRIPTION

Figure 1:
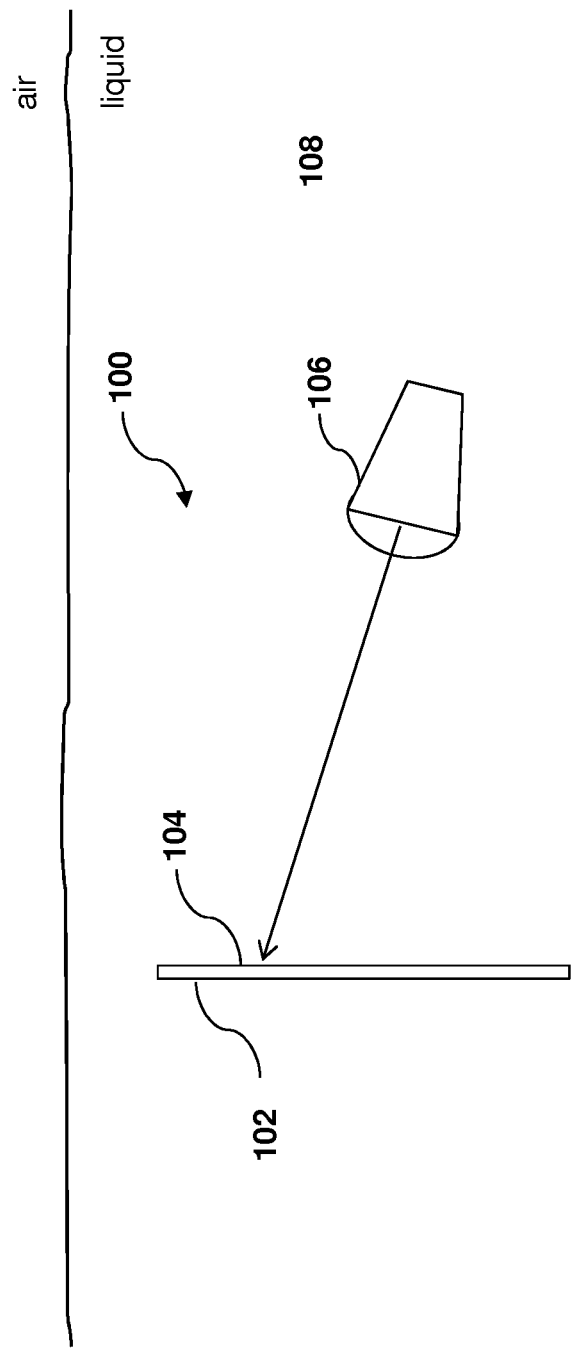
FIG. 1 is an exemplary diagram of a liquid environment projection system according to one or more embodiments of the disclosure.

The following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

As used herein the term "liquid crystal microdroplet (LCMD) device" or "LCMD film" or "LCMD display" means a device or film or display, respectively, formed using various classes of polymer films. In these types of film, liquid crystal material is contained in microdroplets embedded in a solid polymer matrix. For example, an LCMD device may be formed using nematic curvilinear aligned phase (NCAP) films, such as material and devices described in U.S. Pat. No. 4,435,047 filed Sep. 16, 1981 disclosing "Encapsulated Liquid Crystal and Method," which is incorporated by reference herein in its entirety. An LCMD device may also be formed using polymer dispersed liquid crystal (PDLC) films formed using phase separation in a homogenous polymer matrix, such as material and devices described in U.S. Pat. No. 4,688,900 filed Sep. 17, 1985 disclosing "Light Modulating Material Comprising a Liquid Crystal Disperson in a Plastic Matrix," which is incorporated by reference herein in its entirety. An LCMD device may also be formed using a non-homogenous polymer dispersed liquid crystal display (NPD-LCD) formed using a non-homogenous light transmissive copolymer matrix with dispersed droplets of liquid crystal material, such as material and devices described in U.S. Pat. No. 5,270,843 filed Aug. 31, 1992 disclosing "Directly Formed Polymer Dispersed Liquid Crystal Light Shutter Displays," which is incorporated by reference herein in its entirety. Other forms of liquid crystal microdroplet films may also be suitable. An LCMD device may be configured in one of two modes. In a positive mode, an LCMD device is switchable between an opaque state without an applied electrical voltage and clear state with an applied electrical voltage. In a negative mode, an LCMD device is switchable between a clear state without an applied electrical voltage and an opaque state with an applied electrical voltage.

In general, liquid environment projection systems may enhance underwater experiences and capabilities for both humans and animals. For example, underwater projection systems may provide information into an underwater environment for use in entertainment, medical treatment, engineering, manufacturing, or research activities. Underwater projection systems may display images visible to viewers, including humans and animals. Thus, the underwater projection systems may influence the viewer's underwater experience. Projecting underwater images either with or without audio may also allow researchers to communicate with and study animals in an underwater environment.

Referring now to FIG. 1, an apparatus 100 for liquid environment projection is illustrated according to an embodiment of the present disclosure. The apparatus includes a projection display member 102 with a projection surface 104 and a projector 106 for projecting an image on to the projection surface. As shown in FIG. 1, portions of the apparatus 100 are installed in liquid 108. Suitable liquids may include, for example, fresh water, salt water, oil, or alcohol. Generally, the liquid may be clear but colored liquids or liquids containing suspended solid particles may also be suitable. The liquid may be contained, for example, in an indoor or outdoor man-made enclosure such as a pool or aquarium or in a natural water formation such as a lake or sea. A man-made enclosure may include a tank or other vessel sealed or otherwise made watertight.

As shown in FIG. 1, the projection display member 102 is positioned in the liquid 108. The projection surface 104 faces the projector 106 and receives an image (e.g., still image, video image) which may be a two- or three-dimensional image from the projector. The projection display member 102 may be an LCMD device connected to an electrical power supply. Alternatively, the projection display member may be a wall of a liquid enclosure, such as a wall of a pool. Other suitable projection display member materials may include textiles, wood, plastic, fiberglass, metal, inorganic material (e.g., stone, ceramic) or a combination materials. In various embodiment, the projection surface may be chemically treated to repel or block liquids.

NPD-LCD, which may be viewable from 360 degrees, has waterproof properties that may be particularly suitable for this embodiment. Since any chemical with faster reactivity can be used in NPD-LCD to form the main body of the copolymer matrix, water repelling chemicals such as silicon containing and fluorine containing reagents and aromatic groups and polycyclic groups can be easily included into the system without a difficulty of index matching. Further, NPD-LCD film, when used in an aquarium, can be switched to a transparent state and holographic images of underwater creatures or structures may be projected on the screen, allowing the user to see real and virtual creatures and structures at the same time.

The projector 106 may be any form of an image projector including, for example, an image projector such as a video or still image projector. The projector 106 is installed to face and transmit an image toward the projection surface 104. The projector 106 may be connected to a power supply located in the liquid environment or in an adjacent non-liquid (e.g., air) environment. The projector 106 includes a light source, such a light bulb or a LED bulb, an image converter, and a plurality of lenses. The projector 106 may include a computer or is connected to a computer providing a digitized image to the image converter. A light generated from the light source may be projected to the image converter, therein the digitized image is converted to an optical image, and then is projected (focused) on the projection surface 104. The projector 106 may have sealed components to make the projector generally impervious to liquid. Alternatively, the projector may be housed in an enclosure that prevents liquid from accessing components of the projector that would be damaged by liquid.

The apparatus 100 may be used for underwater projection in furtherance of any of variety of purposes. For example, educational uses may include displaying how to protect oceans in coral reef area or showing background information of exhibits in an underwater museum. Advertising uses may include, for example, showing how an NPD-LCD underwater projection film/panel works; advertising for a product by showing an actual potential leaking weakness with adverse consequences; showing the power of a glue to fix leaks. Fitness and exercise uses may include, for example, showing demonstrations for underwater yoga or other workout or showing a video or television program for an underwater treadmill user. Training uses may include, for example, training for synchronized swimming or running. Uses for guiding underwater operations may include, for example repairing or assembling an underwater oil well. Underwater therapy uses may include, for example, displaying instructions or demonstration videos for an underwater exercise. Entertainment uses may include, for example, presenting a birthday cake and candles at an underwater party or showing images of a bride and groom for use in an underwater marriage ceremony. Gaming uses may include, for example, stepping on projected images or laser shooting projected sea animals or other targets. Camouflage uses may include, for example, underwater projection panels that can be used to hide a submarine by showing surrounding images such as coral reef or sea-plant to increase difficulty to be identified from sky, so that the submarine is safer when in shoal water. Underwater movie uses may include, for example, allowing a user to experience visual and sound effects from a fish environment or moving terrestrial landscapes into an ocean environment. Filmmaking uses may include, for example, make a filming studio by using a water tank for close-up shots while using a NPD-LCD projection screen/film installed on one or more walls of the tank for projecting images used in a longshot. Many underwater movie scenes can be made with a combination of true underwater scenes and simulated backgrounds on the projection screen. Photography uses include, for example, showing land animals in an underwater environment or generating an art effect with underwater lighting to view a statue. Suitable uses may also include photography background including, for example, displays of various backgrounds for photography for travelers wearing a diving suit. Research uses include, for example, studying fluid dynamics by directly showing fluid images and data; studying underwater images and sound effects; and studying responses or relationships of sea creatures with their prey or predators. Underwater display uses for swimming pools may include, for example, underwater TV for viewing during a swimming workout while wearing a snorkel in a still or running water pool. Further underwater display uses include, for example, showing a score or position for a race or enhancing the aesthetic conditions of a user during a swimming workout or while wearing a snorkel in a simulated ocean environment like a simulation of flying. Aquarium display uses include, for example, putting an NPD-LCD film on a side of an aquarium for watching projected TV when the film is in opaque state and for allowing the fishes to be seen when not watching TV and the NPD-LCD film is in clear state.

Decorating or other ambiance uses include, for example, a wall-sized water/fish tank in a room, hotel or convention center with still features or moving features such as live fish or air bubbles. A back wall of the tank may be an NPD-LCD projection film. An ocean movie, an underwater activity or any other kind of underwater simulation can be projected on the back wall. Such a device can offer the impression of a much greater and deeper underwater space and provide more information or depth to a very limited actual space. Such uses may have significant decorating and attracting function. Such installations may use an underwater projector or a projector projecting from a position external of the water enclosure. Space between the projector and the projection screen may be eliminated by using a short throw projector. Such a projector can be directly mounted or connected to the projection screen/panel.

The apparatus 100 may also be used, for example, to attract underwater creatures. For example, the apparatus may be used to display bait on an NPD-LCD projection film/panel in a lake or ocean at night. Use of the apparatus may allow fishing in dark with hooks or nets around the panel. In these ways, farmers or environmental protectors can also catch and remove or otherwise control unwanted species by displaying their favor foods or prey to attract the species. This kind of "fish attractor" may concentrate fishes in lake and ocean and increase production. Many underwater creatures are attracted to light, with some deep ocean fishes generating light to attract preys. The apparatus 100 may have a similar attraction function. An image projected on an NPD-LCD film/panel, in its opaque state, is viewable from both sides and thus can attract fish from all directions. The projected surfaces, such as NPD-LCD display, can also be many other shapes including curved, cylindrical, or spherical.

A further use of the apparatus 100 is driving out or repelling underwater creatures. For example, lake farmers may create a relative safe zone for baby fishes or for a hatching area by displaying on the projection screen predators to drive out adult fish which may eat the baby fishes or eggs. Thus, production yields may be increased. Further the apparatus 100 may be used for repelling sharks for beach safety by displaying a shark repellant such as ejected squid ink, killer whales, or sparks.

Figure 2:
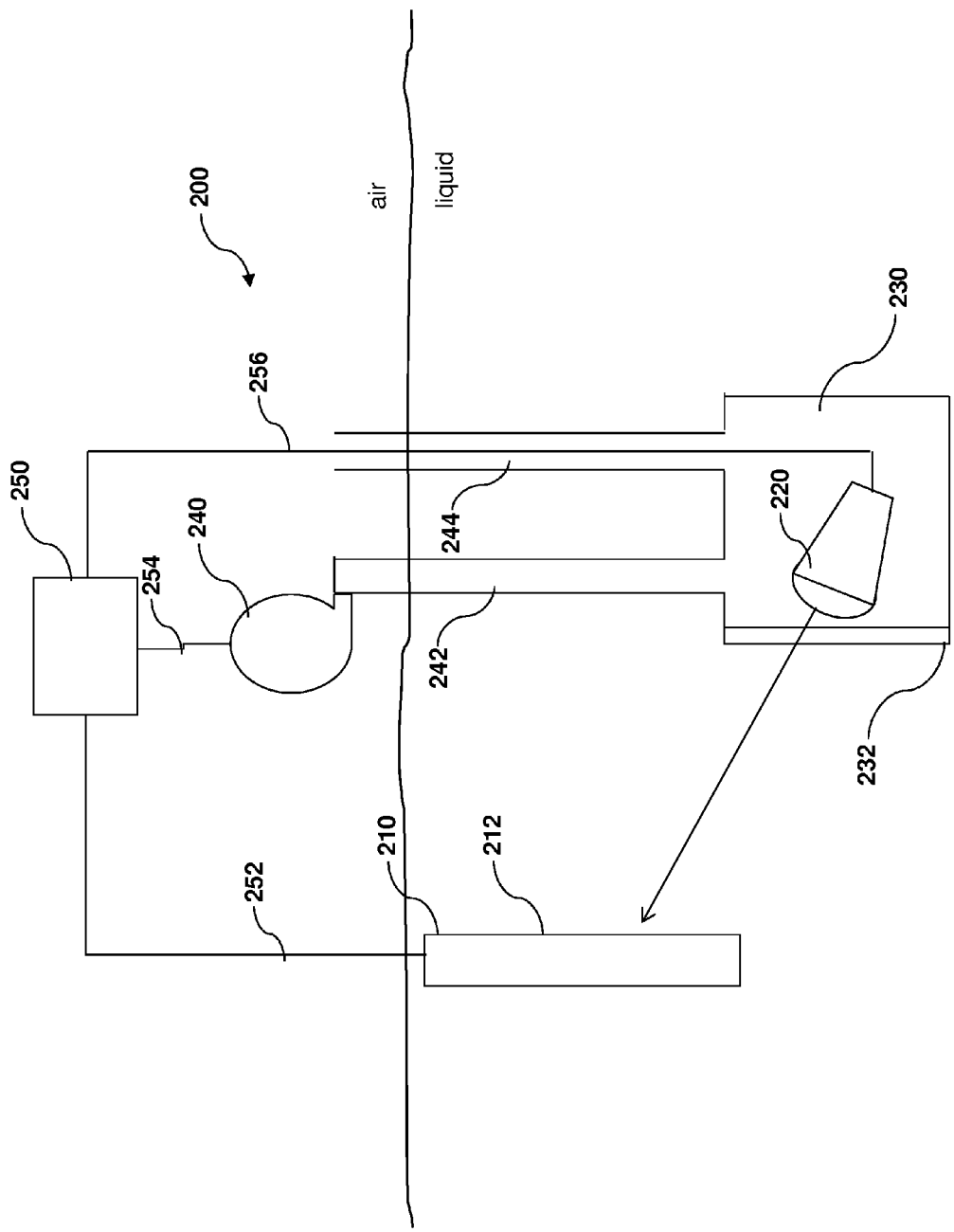
FIG. 2 is an exemplary diagram of a liquid environment projection system according to another embodiment of the disclosure.

Referring now to FIG. 2, an apparatus 200 using a switchable projection display for liquid environment projection is illustrated according to one or more embodiments of the present disclosure. The apparatus 200 is an example embodiment and is not intended to limit the present invention beyond what is explicitly recited in the claims. The apparatus 200 includes a projection screen 210, a projector 220, an enclosure 230, a clear panel 232, a blower 240, an exhaust tubing 242, an electrical power supply 250, and electrical supply cords 252, 254, 256. However, other configurations and inclusions or omissions to the apparatus 200 may be possible. As shown in FIG. 2, portions of the apparatus 200 are installed in liquid. Although the liquid may be referred to as water in this embodiment, suitable liquids may include, for example, fresh water, salt water, oil, or alcohol. Generally, the liquid may be clear but colored liquids or liquids containing suspended solid particles may also be suitable. The liquid may be contained, for example, in an indoor or outdoor man-made enclosure such as a pool or aquarium or in a natural water formation such as a lake or sea. A man-made enclosure may include a tank or other vessel sealed or otherwise made watertight.

The projection screen 210 is submerged in the water. The projection screen 210 includes a projection surface 212 that faces the projector 220 and receives an image in the form of light energy directed from the projector toward the projection surface. The projection screen 210 may be connected to the electrical power supply 250 through the electrical cord 252. In this embodiment, the projection screen 210 includes a switchable LCMD film. The submersed projection screen 210 with an LCMD film is switchable between a transparent (clear) state and an opaque state with or without electrical voltage. Alternatively or additionally, the projection screen includes a wall of a liquid enclosure, such as a wall of a pool. Other suitable projection screen materials may also be used, including organic materials such as textile, wood, or plastic; inorganic materials such as fiberglass, metal; or combinations of organic and inorganic materials.

The projector 220 may be any form of a light-based image projector including, for example, an image projector such as a video or still image projector. The projector 220 is installed to face and transmit an image toward the projection surface 212. The projector 220 is connected to the power supply 250 by the electrical cord 256. The projector 220 includes a light source, such a light bulb or a LED bulb, an image converter, and a plurality of lenses. The projector 220 may include a computer or is connected to a computer providing a digitized image to the image converter. A light generated from the light source is projected to the image converter, therein the digitized image is converted to an optical image, and then is projected (focused) on the projection screen 210.

As shown in FIG. 2, the enclosure 230 is located underwater. The enclosure 230 houses the projector 220 and provides a safe space or room for the projector in an underwater environment. For example, the enclosure 230 is watertight and prevents water from contacting the projector 220. The enclosure 230 includes the clear panel 232 (e.g., formed of glass or clear plastic) between the projection display 210 and the projector 220. The image generated from the projector 220 passes through the clear panel 232 and projects onto the projection screen 210.

The enclosure 230 is connected to the blower 240 through the first exhaust tubing 242. A first end of the first exhaust tubing 242 is connected to the enclosure 230 and a second end of the first exhaust tubing 242 is connected to the blower 240. The enclosure 230 is also connected to the second exhaust tubing 244. A first end of the second exhaust tubing 244 is connected to the enclosure 230 and a second end of the second exhaust tubing 244 is above to the water and opens to the environmental air. The blower 240 is connected to the enclosure 230 by the first exhausted tubing 242. The blower 240 is also connected to the electrical power supply 250 through the electrical cord 252. The blower 240 provides a cooling medium, such as air, to the enclosure 230 by the first exhaust tubing 242. The heat generated by the projector 220 is dissipated through the cooling medium by the second exhaust tubing 244.

The power supply 250 may be a central or distributed power supply and is connected to the projection display 210, the projector 130, and the blower 240. The power supply 250 provides power to operate the projector 220 and the blower 240. The power supply 250 may also apply an electrical voltage to projection screen 210 to change state of the projection screen between transparent and opaque states.

Some light bulbs such as LED light bulb or microwave light bulb generate much less heat than mercury light bulb. In such alternative embodiment, the blower and exhaust system and the enclosure 230 may be eliminated because water is a good heat dissipation media if a projector 220 itself has a liquidproof (e.g. waterproof) outer casing that resists the ingress of liquid. Since water is a better heat conductive media than air, heat dissipation may be accomplished more efficiently in an underwater environment than in an air environment. In one embodiment, a waterproof projector may be cooled by using the projector's shell or body to dissipate heat. For example, an air cooling system, including a fan inside the projector, delivers heat generated by the projector to a shell of the projector. The shell then dissipates the heat to the water environment. In another embodiment, a water flow is placed in close proximity to a light bulb or other heat-generating components of the projector. The heat transfers to the water and is moved by the flow of the water away from the projector. Flowing water may be achieved by, for example, a propeller, a pump, or by the natural movement force of different densities between hot and cool water. The projector may have a metal shell and/or a corrugated or other high surface area container for efficient heat dissipation. Other enclosure systems with efficient heat dissipation properties may also be suitable. A battery operated projector may be benefited by the use of low heat generating and low energy consumption light bulbs. Such a battery operated projector (without tether to a stationary power source) is also more convenient when displaying projected images in different locations or when moving the projector between locations.

In use, an image generated by the projector 220 located inside the enclosure 230 passes through the clear panel 232 and projects on the projection screen 210. The image may include a static image or dynamic continuous image. The heat generated by the projector 230 is dissipated by the heat conductive material of the corrugated or high surface area of the enclosure 230. The heat is also further dissipated by the first exhausted tubing 242 and the second exhausted tubing 244. For example, the blower 240 provides a cooling medium, such as air, to the enclosure 230 through the first exhausted tubing 242 and dissipates the heat through the second exhausted tubing 244.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An image projection system, the image projection system comprising:
   a liquid media; and
   a projection surface comprising a projection screen positioned in the liquid media, wherein the projection screen includes a liquid crystal microdroplet (LCMD) device being switchable between a clear state and an opaque state in response to an electric voltage and being positioned in the liquid media; and
   a video projector positioned in the liquid media, wherein the video projector is adapted to project a video image on the projection surface.

2. The image projection system of claim 1 further comprising a liquid-proof projector enclosure wherein the projector enclosure is sized and configured to contain the projector.

3. The image projection system of claim 2 wherein the liquid-proof projector enclosure includes a transparent wall.

4. The image projection system of claim 2 further comprising a heat dissipation system adapted to dissipate heat generated by the projector.

5. The image projection system of claim 4, wherein the heat dissipation system comprises a blower and exhaust tubing coupled to the liquid-proof projector enclosure.

6. The image projection system of claim 4, wherein the heat dissipation system includes a corrugated high surface box forming the liquid-proof projector enclosure.

7. The projection apparatus of claim 6, wherein the corrugated high surface box includes a heat conductive material.

8. The image projection system of claim 1 wherein the projector includes a liquid-proof outer casing.

9. The image projection system of claim 1 wherein the projector includes a liquid-proof shell.

10. The image projection system of claim 1 wherein the projector includes a cooling system adapted to conduct heat through a shell of the projector into the liquid environment.

11. The image projection system of claim 1 wherein the projector includes a water cooling system.

12. The image projection system of claim 1 wherein the projector is battery operated.

13. A method of projecting an image in a liquid media, the method comprising:
   providing a projection surface positioned in the liquid media, the projection surface comprising a projection screen, the projection screen including a liquid crystal microdroplet (LCMD) device being switchable between a clear state and an opaque state in response to an electric voltage and positioned in the liquid media;
   providing a video projector positioned in the liquid media; and
   projecting an video image from the video projector to the projection surface through the liquid media.

14. The method of claim 13 further comprising:
   containing the projector in a liquid-proof projector enclosure, wherein projecting the image includes projecting through the projector enclosure.

15. The method of claim 13 further comprising:
   dissipating heat away from the projector.

16. The method of claim 13 further comprising:
   conducting a flow of water from the projector toward the liquid media to dissipate heat from the projector.

17. The method of claim 13 further comprising:
   containing the projector in a corrugated projector enclosure, wherein projecting the image includes projecting through the projector enclosure.

18. The method of claim 13 wherein the projector is battery-operated.

* * * * *